United States Patent [19]

Hough

[11] Patent Number: 4,783,116

[45] Date of Patent: Nov. 8, 1988

[54] SUNROOF FRAME ASSEMBLY FOR VEHICLES

[75] Inventor: Louis E. Hough, St. Clair Shores, Mich.

[73] Assignee: Empire Automotive, Inc., Mt. Clemens, Mich.

[21] Appl. No.: 43,103

[22] Filed: Apr. 27, 1987

Related U.S. Application Data

[63] Continuation-in-part of Ser. No. 699,093, Feb. 7, 1985, Pat. No. 4,666,206.

[51] Int. Cl.$^4$ ............................ B60J 7/08; B60J 7/195
[52] U.S. Cl. ...................................... 296/216; 296/218
[58] Field of Search ................ 296/214, 216, 224, 218

[56] References Cited

U.S. PATENT DOCUMENTS

| | | | |
|---|---|---|---|
| 3,974,753 | 8/1976 | Blomgren et al. | 296/218 |
| 4,120,524 | 10/1978 | Buck, Jr. | 296/224 X |
| 4,428,170 | 1/1984 | Wooten et al. | 296/218 X |
| 4,666,206 | 5/1987 | Hough | 296/216 |

FOREIGN PATENT DOCUMENTS 3545973 8/1986 Fed. Rep. of Germany ...... 296/216

Primary Examiner—Dennis H. Pedder
Attorney, Agent, or Firm—Cullen, Sloman, Cantor, Grauer, Scott & Rutherford

[57] ABSTRACT

A frame assembly for mounting a sunroof panel in the roof of a vehicle includes top and bottom portions respectively disposed above and below the roof and which are secured together with the roof tightly sandwiched therebetween. The bottom frame portion includes a lateral channel-like extension for supporting a weatherstrip which engages and supports the sunroof panel. The top and bottom frame portions include a first set of opposing flanges between which the vehicle's roof is tightly sandwiched and a second set of opposing flanges between which a portion of the weatherstrip is trapped, thereby mounting the weatherstrip on the frame and creating a positive seal around the entire perimeter of the frame which prevents moisture from entering the vehicle between the weatherstrip and the frame. The frame portions are drawn together against the roof by screws extending through the bottom frame portion into a continuous rib in the top frame portion which is received within a channel in the bottom frame portion. The frame portions are particularly simple in geometry and may be manufactured by die casting or molding techniques.

7 Claims, 2 Drawing Sheets

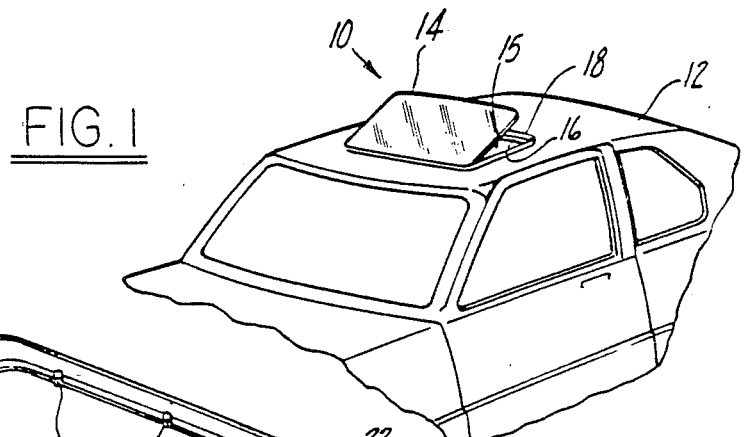
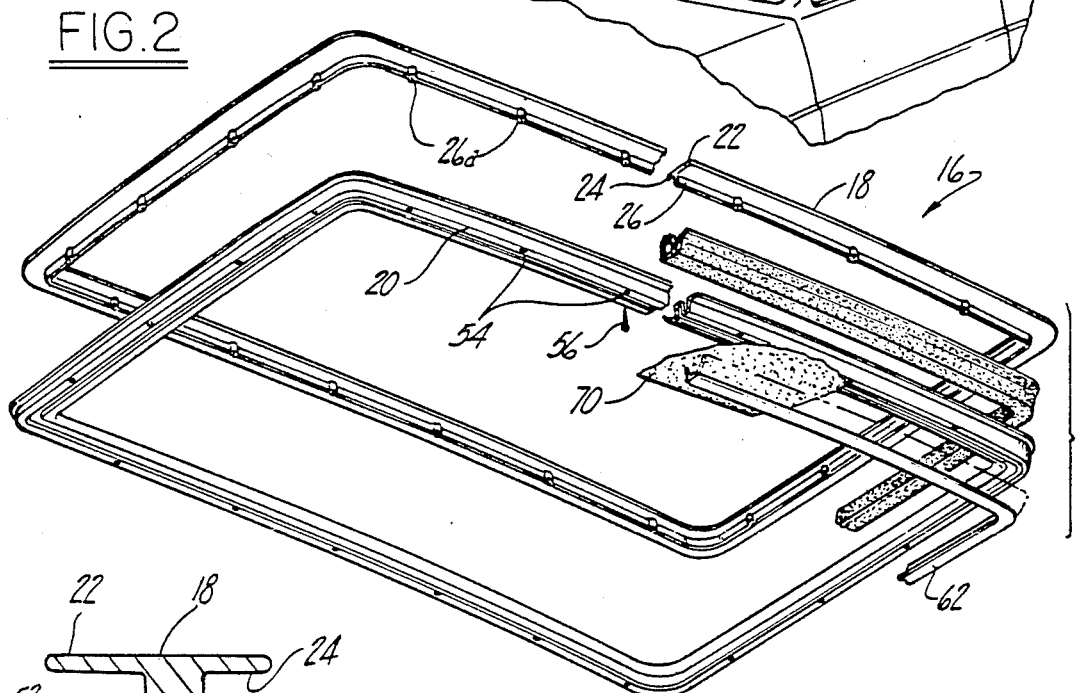
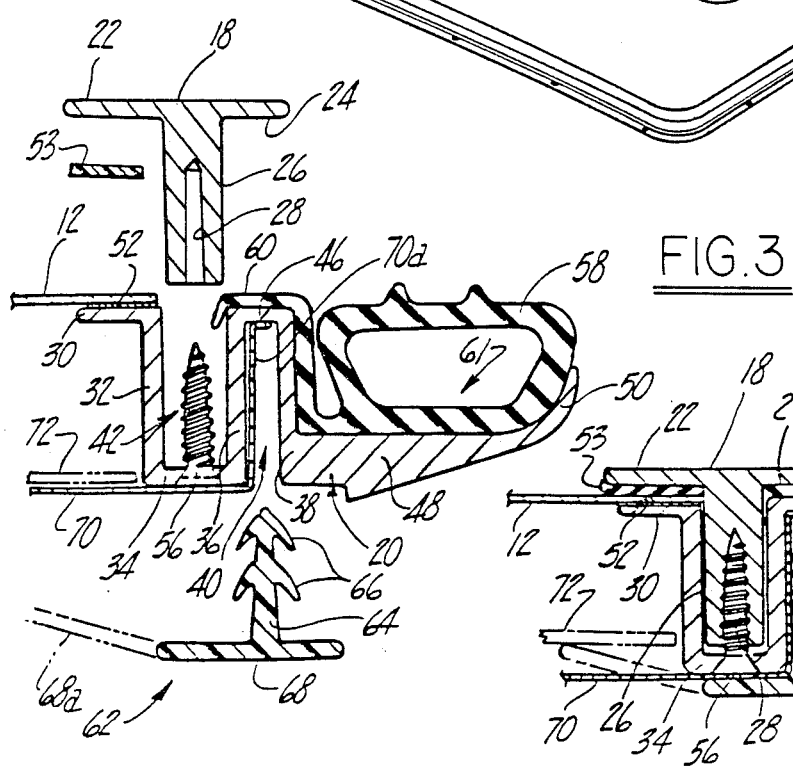
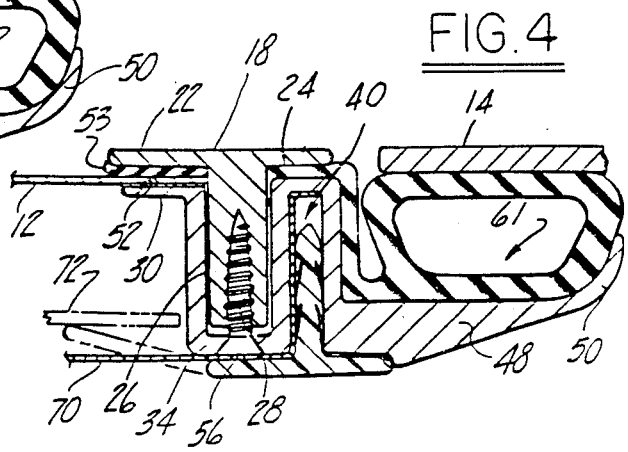

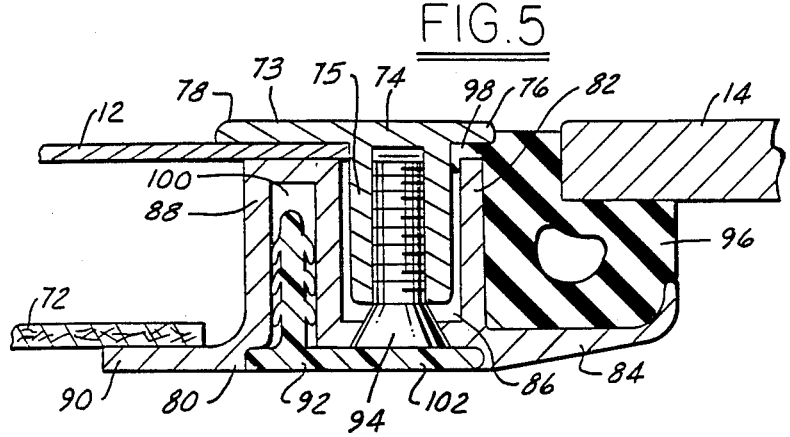
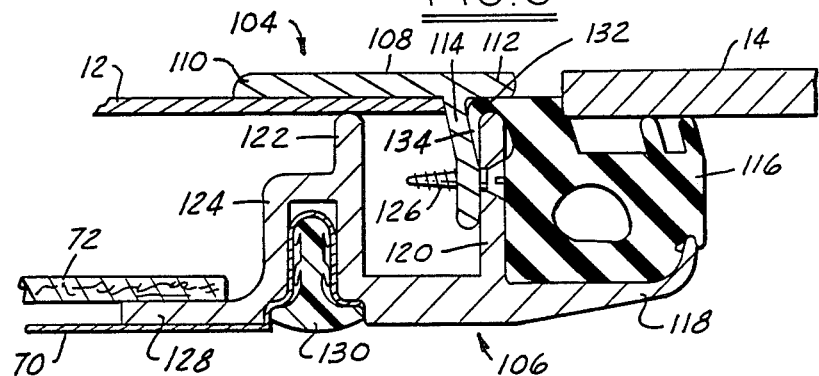
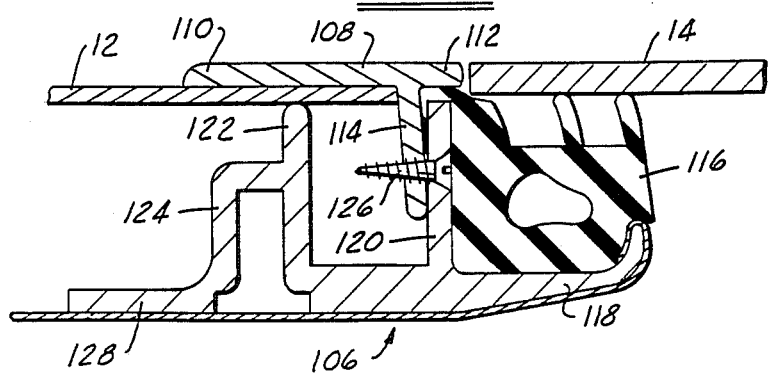

SUNROOF FRAME ASSEMBLY FOR VEHICLES

RELATED APPLICATIONS

This is a continuation-in-part of U.S. patent application Ser. No. 699,093 filed Feb. 7, 1985 now U.S. Pat. No. 4,666,206.

TECHNICAL FIELD

The present invention broadly relates to hatches or sunroofs installed in the roof of a vehicle, and deals more particularly with an improved sunroof frame assembly for mounting and supporting a sunroof closure panel.

BACKGROUND ART

One type of sunroof assembly that has gained popularity and widespread use in recent years includes a manually operable sunroof panel which is mounted by hinges or latches on a frame that can be easily installed in the vehicle's roof either at the factory at the time the vehicle is manufactured, or at a later point in time as a retrofit to the vehicle.

The frames used in the sunroof assemblies of the type described above normally employ a primary frame section which overlies the support surface of the roof and which includes a peripheral flange for supporting the sunroof panel. A weatherstrip mounted in a channel formed on the flange engages the panel and is intended to prevent the entry of moisture into the vehicle between the panel and the surrounding frame. In some case, the weatherstrip is held in place on the flange by means of a suitable adhesive. In other designs, the weatherstrip mounting consists of an interlocking connection between the weatherstrip and the frame; a portion of the weatherstrip is held within specially configured ways defined by undercuts in the frame.

Neither of these prior art techniques of mounting the weatherstrip on the frame is totally effective in sealing the sunroof assembly against moisture penetration. Adhesives sometimes harden and crack or otherwise deteriorate, thus allowing entry of moisture. Mechanical interlocks require tolerances between the weatherstrip and the frame undercuts which create a path for the entry of moisture. The possibility of moisture entry in prior art sunroof assemblies is further increased due to the fact that the weatherstrip is not positively pressed against the frame to create a positive seal therebetween.

The prior art frames are rather complex in configuration for several reasons, including the need for providing undercuts therein which are used for mounting the weatherstrip, and the need for providing a cavity into which the edges of the interior headliner may be tucked in order to provide a finished appearance inside the vehicle. As a result of the relative complexity of frame geometry, particularly in cross-section, known prior art frames are normally manufactured by extrusion techniques. This manufacturing method is rather expensive on a piece part basis because a multiplicity of processing steps are required, including the steps of making the initial extrusion, welding the ends of the extrusion together to form the frame, drilling the frame, hand finishing the extrusion, etc.

Consequently, there is a need in the art for a sunroof frame assembly which is particularly simple in design in order to reduce manufacturing costs, and which also provides an improved arrangement for mounting the weatherstrip in a manner which creates a positive, weather-tight seal. The present invention satisfies these objectives.

SUMMARY OF THE INVENTION

According to the present invention, an improved frame assembly is provided for use with sunroofs, comprising top and bottom frame portions which are drawn against each other, and against the sheet metal roof of the vehicle by screws which interconnect the frame portions. The frame portions include a first set of outer flanges between which an edge of the roof panel is sandwiched, and a second set of inner flanges between which a portion of the weatherstrip is tightly trapped under pressure, thereby mounting the weatherstrip while at the same time assuring a weather-tight seal. The weatherstrip is supported by a channel-like lateral extension formed integral with the bottom frame portion. In one embodiment of the invention, a second channel in the bottom frame portion matingly receives a continuous, downwardly projecting rib in the top frame portion. A third channel in the bottom frame portion provides a cavity into which the edges of the vehicle's interior headliner may be tucked in order to provide a finished appearance for the vehicle's interior. In those vehicles having a rigid type of headliner, a trim lace is provided which is received within the third channel and overlies the raw edge of the headliner to provide a finished appearance. In a second embodiment, screws fastening the frame portions together extend transversely through two opposing flanges which respectively extend from the frame portions and perpendicular to the roof. As a result of the relatively simple geometry of the top and bottom frame portions, each may be manufactured as unitary units by simple molding or die casting techniques. Moreover, the frame assembly is particularly simple to install in the vehicle's roof and may be used in connection with virtually any type of hinges, latches and hardware employed to mount the panel in the frame.

BRIEF DESCRIPTION OF THE DRAWINGS

In the drawings, which form an integral part of the specification and are to be read in conjunction therewith, and in which like reference numerals are employed to designate identical components in the various views:

FIG. 1 is a fragmentary, perspective view of a portion of a vehicle having a sunroof installed therein which employs the frame assembly of the present invention;

FIG. 2 is an exploded, bottom perspective view of the frame assembly of the present invention;

FIG. 3 is a partially exploded, cross-sectional view taken through the roof and frame assembly shown in FIG. 1;

FIG. 4 is a view similar to FIG. 3 but showing the upper and lower frame portions in their assembled positions in the roof.

FIG. 5 is a view similar to FIG. 4 but showing an alternate embodiment of the invention; and FIGS. 6 and 7 are views similar to FIG. 4 but respectively showing two additional alternate embodiments of the invention.

DETAILED DESCRIPTION OF A PREFERRED EMBODIMENT

Referring to FIGS. 1-4, the present invention is generally concerned with an improved frame assembly generally indicated at 16 which forms a portion of a sunroof 10 that includes a sunroof panel 14 mounted within an opening 15 in the roof 12 of a vehicle. Roof 12 may be made of, for example, sheet metal. The frame assembly 16 broadly includes top and bottom, rectangularly shaped frame portions 18, 20 both of which extend completely around the perimeter of opening 15 and a weatherstrip 58. The panel 14 may be mounted on the frame assembly 16 using various types of conventional hinges and latch assemblies (not shown) which are well known in the art and therefore need not be described in detail herein. However, these mounting assemblies will be connected to the bottom frame portion 20, normally along the front and rear edges thereof.

The bottom frame portion 20 includes a first upwardly opening, U-shaped channel 42 defined by a base or bight 34 and a pair of upwardly extending legs or walls 32, 36. Outer and inner, substantially co-planar flanges 30, 46 respectively extend outwardly from the top of the associated walls, 32, 36 and are disposed in a plane immediately below the roof panel 12. The outer flange 30 bears against the bottom surface of the roof panel 12. A layer 52 of suitable inert material can be interposed between the flange 30 and roof 12 to prevent galvanic reaction where the materials of the roof panel 12 and flange 30 are dissimilar and may react with each other. The base 34 of the channel 42 includes a plurality of spaced apart through holes 54 therein for receiving later described screws 56 which extend into the channel opening 42 and function to secure together the top and bottom frame portions 18, 20.

The bottom frame portion 20 further includes a lateral extension 61 for supporting the panel 14, which comprises a substantially vertical sidewall 38 connected to the flange 46, a generally horizontal base 48 and an upwardly turned lip 50 which collectively define a channel-like support on which the weatherstrip 58 is mounted. Lateral extension 61 extends into the opening 15. The weatherstrip 58 is formed of any suitable synthetic or rubber material which is resiliently deformable, and includes an edge 60 which overlies flange 46. As best seen in FIG. 3, the vertical sidewall 38 in combination with the wall 36 and flange 46 define a downwardly opening, U-shaped channel 40 which is positioned between channel 42 and the lateral extension 61.

The top frame portion 18 includes an outer flange 22 and an inner flange 24 which lie in a common plane and respectively oppose the outer and inner flanges 30, 46 of the lower frame portion 20. The outer flange 22 bears against the roof panel 12 through a weather-tight seal or gasket 53 formed of a closed cell foam tape, a mastic or RTV silicone. A centrally disposed, continuous rib 26 extends downwardly from the flanges 22, 24 and is received within the U-shaped channel 42 of the bottom frame portion 20. Rib 26 extends completely around the perimeter of the opening. The rib 26 is provided with a plurality of enlarged bosses 26a spaced along its length. Bosses 26a include longitudinal holes 28 for threadably receiving the screws 56.

As best seen in FIG. 2, the frame portions 18, 20 are particularly simple in geometry: the top frame portion is essentially T-shaped in cross-section while the bottom frame portion 20 consists of a series of U-shaped channels, the individual components of which extend substantially perpendicular to each other and do not include any undercuts as are often employed by prior art frame constructions. Consequently, both the top and bottom frame portions 18, 20 may be manufactured as unitary units in a single operation as by molding or die casting a suitable metal alloy or reinforced plastic. The various channel openings, and apertures 28, 54 for the screws 56 are integrally formed in the frame during this single casting step. Accordingly, the frame assembly 16 of the present invention is exceptionally economical to manufacturer, and, as will become apparent hereinafter, the frame assembly 18 is especially simple to install and is highly effective in providing a permanent weather-tight seal in the vehicle's roof 12.

After the opening 15 is formed in the vehicle roof 12, the bottom frame portion 20 is positioned beneath the roof panel 12 with the gasket 52 sandwiched between the roof panel 12 and the outer flange 30. The weatherstrip 58 is then placed in the channel-like lateral extension 61 with the weatherstrip edge 60 overlying the inner flange 46. The top frame portion is then installed by inserting the rib 26 into the channel opening 42, following which the screws 56 are inserted from the bottom of the frame assembly 16, through the apertures 54 and into the rib holes 28. As the screws 56 are tightened, the top and bottom frame portions 18, 20 are drawn toward each other such that the roof panel 12 is tightly sandwiched by positive pressure between the outer flanges 22, 30, while the weatherstrip edge 60 is likewise tightly sandwiched between the inner flanges 24, 46. The constant, positive pressure exerted by the opposing sets of flanges 22, 30 and 24, 46 forms a weather-tight seal between the frame assembly 16, the roof panel 12 and weatherstrip 58. With the frame assembly 16 thus installed, the peripheral edge 70a of the vehicle's flexible headliner 70 is tucked into the channel opening 40 following which a flexible trim lace 62, preferably formed of plastic, is installed to complete the installation. The trim lace 62 includes a rib 64 with one or more flexible barbs 66 which are received within the channel opening 40 and bear against the headliner edge 70. The trim lace 62 includes a flat flange 68 which overlies the channel opening 40 to provide a finished appearance at the intersection of the frame assembly 16 and the headliner 70 while also covering and thereby concealing the heads of the screws 56.

In those vehicles employing a rigid headliner 72 rather than the flexible headliner 70, the trim flange 68 may include an angled extension 68a which overlies and engages the headliner 72.

Attention is now directed to FIG. 5 wherein an alternate form of the present invention is depicted. As shown in FIG. 5, the sunroof frame assembly includes an upper portion generally denoted by the numeral 73 and a lower portion 80. The upper frame portion 73 includes a flange 74 having a first portion 76 extending toward the opening adjacent the sunroof panel 114, and a second portion 78 overlying a portion of the roof 12. Extending downwardly from the flange 74 is a flat rib or projection 75 adapted to threadably receive a plurality of screws 94 (or other fasteners) which function to secure the upper and lower frame portions together. The rib 75 extends completely around the upper frame portion 73.

The lower frame portion 80 includes a lateral extension 84 which is adapted to support the weatherstrip 96.

Lower frame portion 80 further includes an upwardly extending flat rib or projection 82, immediately adjacent the rib 84. The lower frame portion further includes a downwardly opening U-shaped section 88 and an outwardly extending, lateral flange 90. The U-shaped section 88 and rib 82 are spaced apart to form a U-shaped channel 86 which receives the downwardly extending rib 75 of the first frame portion 73. The roof 12 of the vehicle is tightly trapped between the flange portion 78 of the upper frame portion 73 and the U-shaped section 88 of the lower frame portion 80. An edge 98 of the weatherstrip 96 is trapped between the upper and lower frame portions 73, 80 and more particularly between the flange portion 76 and the upper end of the upwardly extending rib 82. Tightening of the screws 94 draws the flange portion 76 toward the end of the upwardly extending rib 82 to form a weather-tight seal, using the edge 98 of the weatherstrip 96, and therefore is highly effective in preventing moisture from entering the vehicle betwen the upper and lower frame portions 73, 80 respectively. The lower frame portion 80 is provided with an outwardly extending, lateral flange 90 which is adapted to support a rigid headliner 72 thereon. A trim lace 92 includes a portion which is frictionally received within an opening 100 defined by the U-shaped section 88. The trim lace 92 further includes a lateral extension 102 which covers the heads of the screws 94 to provide the interior of the frame assembly with a highly finished appearance.

Reference is now made to FIG. 6 wherein still another alternate form of the invention is depicted. The sunroof frame assembly in FIG. 6 includes an upper portion 104 and a lower portion 106 joined together by suitable fasteners such as screws 126. The lower frame portion 106 includes a laterally extending, lateral extension 118 which is adapted to support thereon the weatherstrip 116. The lower frame portion 106 further includes an upwardly extending flange or projection 120 defining a wall engaging one side of the weatherstrip 116. Lower frame portion 106 further includes a second upwardly extending projection 122, a downwardly facing U-shaped portion 124 and a lateral extension 128 which is adapted to support a rigid headliner 72 thereon. The downwardly extending U-shaped portion 124, forms a channel for receiving an edge of a soft headliner 70, as well as a trim lace 128 which holds the edge of the headliner 70 within the channel.

The upper frame portion 104 includes a horizontally extending flange 108, and a downwardly extending flange 114. Flanges 114 and 120 extend essentially perpendicular to the roof 12. The horizontal flange 108 extends generally parallel to the roof 12 and includes a first portion 110 which overlies the upwardly extending projection 122, and a second portion 112 which overlies the upwardly extending projection 120. Tightly trapped between the upper edge of the projection 120 and the second flange portion 112 is an edge 132 of the weatherstrip 116. The vehicle's roof 12 is also tightly trapped between the first flange portion 110 and the upper projection 122.

The outer extremity 134 of the weatherstrip edge 132 is also trapped between a portion of the opposing faces of the lower flange 114 and the upwardly extending projection 120. The fastening screws 126 extend substantially horizontally through the upstanding projection 120 and lower flange 114. During assembly of the sunroof frame assembly, the weatherstrip edge portion 134 acts as a fulcrum and causes the flange portion 110 to rotate downwardly thereby tightly trapping the roof 12 between the flange portion 110 and upward projection 122. At the same time, as the projection 120 and flange 114 are drawn together, the weatherstrip edge portion 134 becomes tightly sealed against the opposing faces of the flange 114 and projection 120 to further assure a weather-tight seal between the upper and lower frame portions 104, 106. The head of the screws 126 are essentially covered by one face of the weatherstrip 116. As a result of the fact that the edge 132 of the weatherstrip 116 overlies the head of the screws 126, water or other weather elements are prevented from entering the vehicle through or around the openings through which the screws 126 extend. It should be noted that by the construction shown in FIG. 6, the screws 126 are covered from sight and do not require any form of plugs or finishing strips on the interior of the vehicle to cover the heads of such screws. Additionally, the construction shown in FIG. 5 is more aesthetically desirable because the overall widths (in cross-section) of the upper and lower frame portions are reduced, compared to the embodiments shown in FIGS. 2-4. The flange 108 of the top frame portion 104 can be made particularly narrow since the top frame does not require a relatively wide channel within which to receive fastening screws, such as the channel section 86 shown in FIG. 5.

FIG. 7 is a view similar to FIG. 6 but depicts the alternate form of the invention in connection with a soft headliner which extends over the lower exposed face of the lower frame portion 106, and has the edge thereof wrapped around the outer edge of the lateral projection or channel 118 and is trapped between the supporting channel 118 and the weatherstrip 116.

The embodiments shown in FIGS. 6 and 7, because of their relative simplicity, can be die cast or molded, for example, and also require the use of less metal.

From the foregoing, it is apparent that the sunroof frame assembly described above not only provides for the reliable accomplishment of the objects of the invention but does so in a particularly effective and economical manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A frame assembly for mounting a sunroof panel in an opening of a vehicle's roof, comprising:
   first and second frame portions secured together with a section of said roof interposed therebetween; and
   a weatherstrip extending around said opening for engaging and forming a weather-tight seal between said frame assembly and said panel, a portion of said weatherstrip engaging said first and second frame portions and being compressed between and forming a weather-tight seal between said first and second frame portions,
   said first frame portion including a first flange extending generally parallel to said roof and said second frame portion including a projection extending generally transverse to said roof and underlying said first flange, said weatherstrip portion engaging and being trapped between said first flange and said projection.

2. The frame assembly of claim 1, wherein said first frame portion includes a section overlying said roof section and said second frame portion includes a section beneath said roof section, said second frame portion including a lateral extension beneath said panel for supporting said panel and said weatherstrip thereon, said weatherstrip being mounted on and engaging said lateral extension.

3. The frame assembly of claim 1, including elongate fasteners extending essentially parallel to said roof and interconnecting said first and second frame portions. second frame portions.

4. A frame assembly for mounting a sunroof panel in the roof of a vehicle, comprising:

upper and lower frame portions having a section of said roof trapped therebetween, each of said frame portions respectively including one of a first and second flange, said first and second flanges having opposing faces disposed below and extending essentially perpendicular to said roof section; and means extending transversely through said faces for securing together said opposing flanges, one of said flanges extending upwardly from said lower frame and said upper frame portion includes a section overlying an upper extremity of said one flange, said frame assembly including a weatherstrip extending around said opening and engaging said panel for forming a weather-tight seal between said panel and said frame assembly, a first portion of said weatherstrip engaging said upper and lower frame portions and being trapped between said upper extremity of said one flange and said section of said upper frame portion overlying said upper extremity.

5. The frame assembly of claim 4, wherein said weatherstrip includes a second portion compressed between upper portions of said opposing flanges and forming a weather-tight seal between said upper and lower frame portions.

6. The frame assembly of claim 4, wherein said lower frame portion includes a lateral extension supporting said weatherstrip thereon.

7. The frame assembly of claim 5, wherein:

said upper and lower frame portions respectively include one of a third and fourth opposing flange between which said roof portion is trapped, and said second portion of said weatherstrip functions as a fulcrum causing one of said third and fourth opposing flanges to be biased against the other of said third and fourth opposing flanges whereby to tightly engage said roof section as a result of force exerted on said first opposing flanges by said securing means.

* * * * *

UNITED STATES PATENT AND TRADEMARK OFFICE
CERTIFICATE OF CORRECTION

PATENT NO. : 4,783,116

DATED : November 8, 1988

INVENTOR(S) : Louis E. Hough

It is certified that error appears in the above-identified patent and that said Letters Patent is hereby corrected as shown below:

Col. 7, line 12, delete "second frame portions."

Signed and Sealed this

Twenty-first Day of March, 1989

Attest:

DONALD J. QUIGG

*Attesting Officer*    *Commissioner of Patents and Trademarks*